US011308214B2

(12) United States Patent
Anati et al.

(10) Patent No.: US 11,308,214 B2
(45) Date of Patent: Apr. 19, 2022

(54) BINARY TRANSLATION FOR HARDENED SOFTWARE SECURITY

(71) Applicant: Intel Corporation, Santa Clara, CA (US)

(72) Inventors: Ittai Anati, Ramat Hasharon (IL); Stanley Gambarin, Belmont, CA (US)

(73) Assignee: Intel Corporation, Santa Clara, CA (US)

( * ) Notice: Subject to any disclaimer, the term of this patent is extended or adjusted under 35 U.S.C. 154(b) by 322 days.

(21) Appl. No.: 16/236,177

(22) Filed: Dec. 28, 2018

(65) Prior Publication Data

US 2020/0210583 A1    Jul. 2, 2020

(51) Int. Cl.
*G06F 21/57* (2013.01)
*G06F 21/62* (2013.01)

(52) U.S. Cl.
CPC ............ *G06F 21/57* (2013.01); *G06F 21/629* (2013.01); *G06F 2221/033* (2013.01)

(58) Field of Classification Search
CPC .. G06F 21/57; G06F 21/629; G06F 2221/033; G06F 21/577
See application file for complete search history.

(56) References Cited

U.S. PATENT DOCUMENTS

| 8,255,280 | B1 * | 8/2012 | Kay | H04L 67/2842 |
| | | | | 705/26.1 |
| 8,321,840 | B2 * | 11/2012 | Nagarajan | G06F 8/33 |
| | | | | 717/126 |
| 2007/0174750 | A1 * | 7/2007 | Borin | G06F 11/1004 |
| | | | | 714/732 |
| 2010/0242114 | A1 * | 9/2010 | Bunker | G06F 21/577 |
| | | | | 726/25 |
| 2013/0283249 | A1 | 10/2013 | Kanhere et al. | |
| 2015/0242637 | A1 * | 8/2015 | Tonn | H04L 63/1433 |
| | | | | 726/25 |
| 2016/0179546 | A1 * | 6/2016 | Yamada | G06F 21/54 |
| | | | | 712/240 |
| 2020/0042715 | A1 * | 2/2020 | Davidi | G06F 21/577 |
| 2020/0065112 | A1 * | 2/2020 | Gotze | G06F 9/30058 |
| 2020/0125475 | A1 * | 4/2020 | Iyer | G06F 8/433 |

OTHER PUBLICATIONS https://software.intel.com/security-software-guidance/software-guidance/bounds-check-bypass, 4 pages, Disclosure date—Jan. 3, 2018.

* cited by examiner

*Primary Examiner* — Meng Li
(74) *Attorney, Agent, or Firm* — Fletcher Yoder, P.C.

(57) ABSTRACT

Processors in computerized systems can be targeted by hostile actors seeking to bypass security policies and may employ published or otherwise known vulnerabilities. Embodiments may include security subsystems and methods of operation that identify known vulnerabilities during execution and implement countermeasures or enforce security policies.

20 Claims, 12 Drawing Sheets

BINARY TRANSLATION FOR HARDENED SOFTWARE SECURITY

BACKGROUND

This disclosure relates to methods and systems for secure execution of software instructions in processing circuitry.

This section is intended to introduce the reader to various aspects of art that may be related to various aspects of the present disclosure, which are described or claimed below. This discussion is believed to be helpful in providing the reader with background information to facilitate a better understanding of the various aspects of the present disclosure. Accordingly, it should be understood that these statements are to be read in this light, and not as admissions of prior art.

Many modern electronic devices employ processors (e.g., microprocessors, central processing units (CPUs)) to perform data computation. These electronic devices are ubiquitous and examples include a wide range of systems, including computers, mobile telephones, media players, smart appliances and smart home gadgets, data center servers, network devices, robotic systems, and several others. Processor-based computation can be found in a wide range of applications due to, among other reasons, the flexibility, and ease for programming of processors. Processors may have controllable logic circuitry including registers and mathematical blocks that can be programmed using instructions stored in an external memory. As a result, a processor can be used to perform substantially different tasks by modification of the instructions being provided to the CPU.

An electronic device that includes a processor may execute several software programs concurrently. To that end, the processor may manage its memory to separate the different programs. To prevent interference between different programs, the context for each software program (e.g., the instructions and data associated with the software program) in the memory may be protected from other software programs. However, certain sequences of instruction may accidentally create vulnerabilities in software programs. Due to the ubiquity of processor-based systems, these vulnerabilities may reach a wide range of systems and make them vulnerable to hacking attacks by hostile actors aware of these vulnerabilities. As a result, processor-based electronic devices may benefit from improved security subsystems that protect against certain known vulnerabilities.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
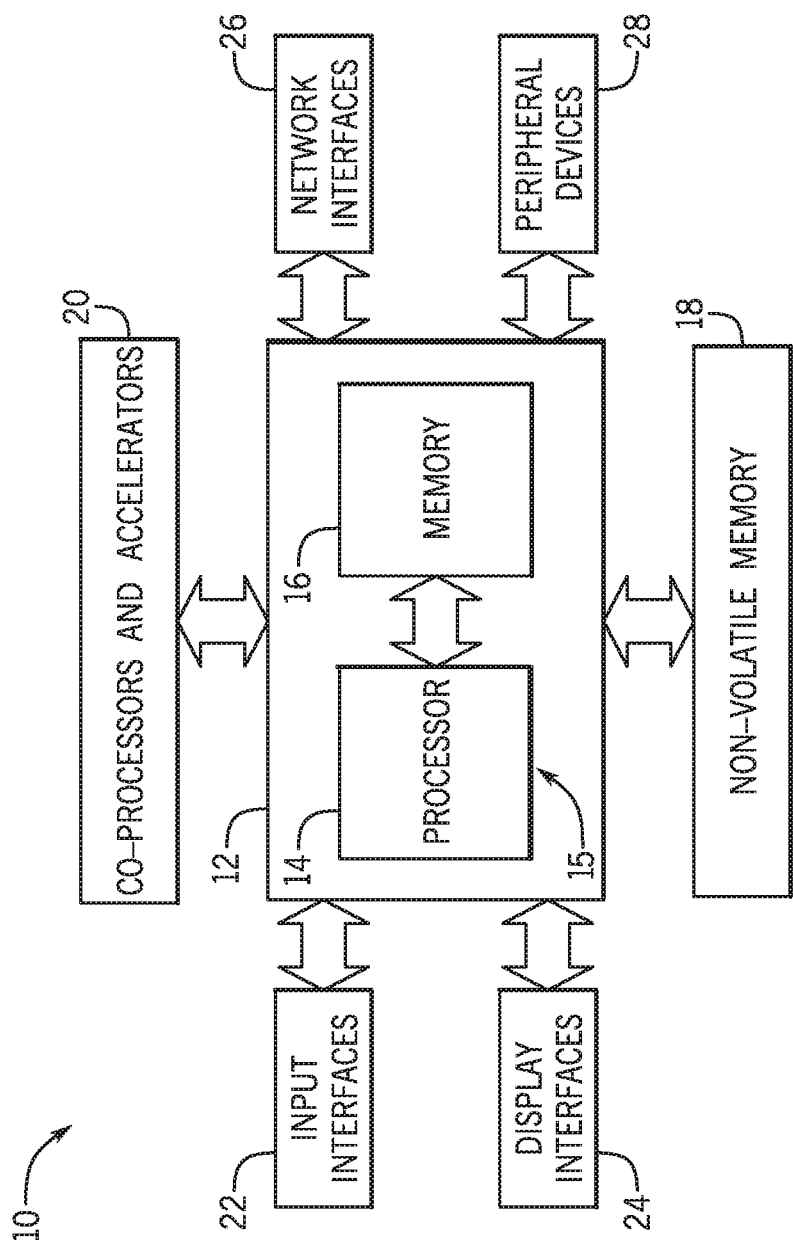
FIG. 1 is a diagram of an electronic device that may include a security subsystem that provides secure execution of instructions, in accordance with an embodiment.
Figure 2:
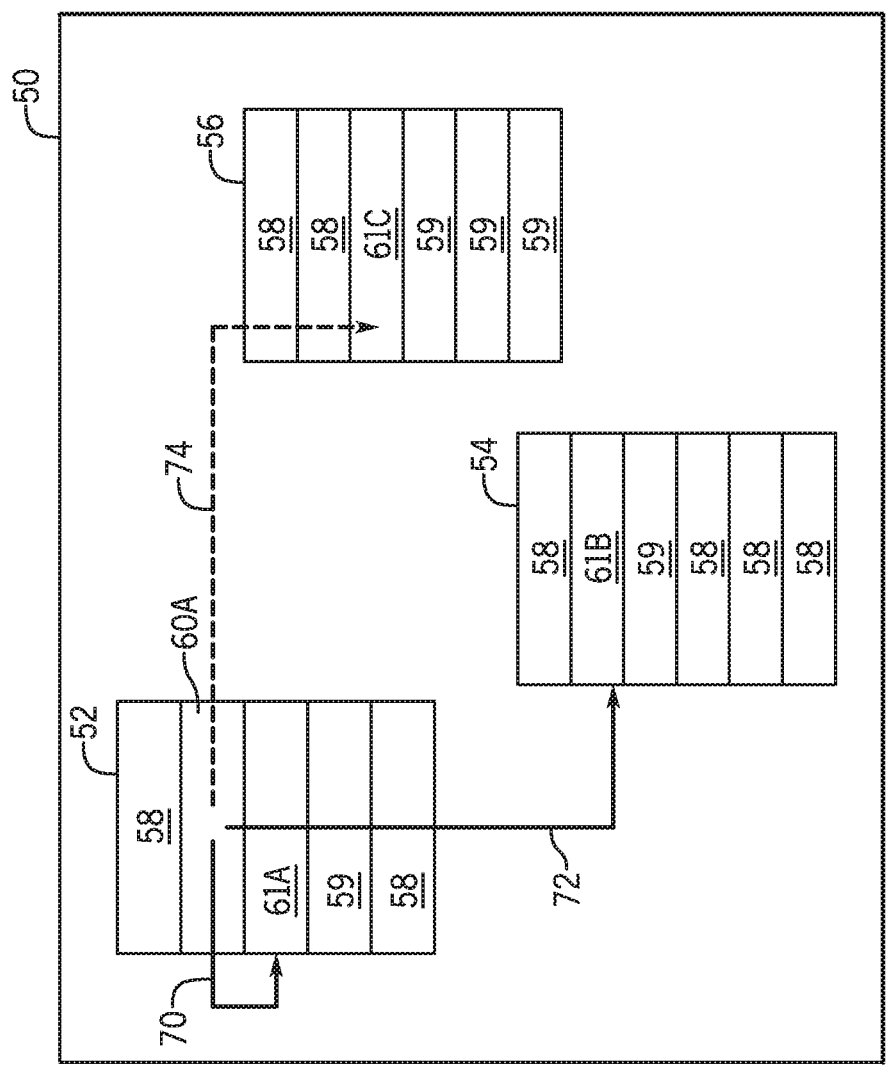
FIG. 2 is a logic diagram of an addressable memory space executing multiple software programs and that may prevent performance of insecure memory calls, in accordance with an embodiment.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B. In the present disclosure, references are made to sequence of instructions or sequence of computer-executable instructions, and it should be understood that such references are intended to refer to be sets having a single instruction or sets having two or more instructions.

Several modern electronic devices may employ processors (e.g., microprocessors, central processing units (CPUs)) to facilitate data processing operations. The processors are commonly used due to the ease of programming and the flexibility to performing a wide range of tasks. Programming of a software program may be performed by coding tasks into instructions to be executed by the processor in a machine-readable language. The instructions may be stored in a processor-accessible memory. To execute the software program, the processor may load and execute the sequences of instructions associated with the software program. Processor-based systems may also be capable of executing multiple software programs simultaneously. To that end, each software program that is running in a processor may have a private and separate memory context, which may include its respective instructions and data. The context of each software program may be expected to be protected from unauthorized access by other software. Such protection may conventionally be achieved using good programming practices, by compiler-level optimizations, and/or sandboxing in the operating system.

Due to its ubiquity, processors are a common target for hacking attack attempts. Among the types of attacks, certain attacks attempt to cause the processor to execute illegal or unauthorized operations. As an example, an attacker may attempt to cause the processor to access some target data prior to validation of the request (e.g., out-of-order execution). Such attack may rely on processor-level optimizations, such as speculative optimization. While a software program would be conventionally prevented from accessing the target data, as the validation of the request is logically performed prior to providing the access in an out-of-order execution, the processor may temporary move or fetch the target data and an attacker may attempt to access it by monitoring the processor activity (e.g., side channel attack). For example, certain optimizations may cause the processor to pre-fetch (e.g., cache) contents from the requested address prior to the verification of its validity in an attempt to accelerate the execution, and to drop the pre-fetched content if the validity verification fails. The attacker may, however, obtain information about the data by monitoring the cache during the pre-fetch.

As vulnerabilities are identified and mitigation strategies are publicized, security updates and good software practices may eliminate the threats posed by these vulnerabilities. However, update of legacy software, by refactoring or by recompilation, and training of software engineers may be slow, and some vulnerabilities may persist in the period following their discovery. The embodiments described herein are related to processor-level systems that may provide safe execution of instructions by targeting known vulnerabilities during runtime. The embodiments may include a security system or subsystem that may identify potential vulnerabilities and implement the mitigations strategies (e.g., countermeasures, security policies). To that end, the security systems and methods described herein may inspect instructions or sequence of instructions being executed seeking instruction patterns associated with known vulnerabilities (e.g., fix up targets, fix up target patterns). When appropriate, the security systems may implement countermeasures during runtime. In some embodiments, a local database including fix up targets and associated countermeasures may be used to inspect sequences of instructions and implement the corresponding countermeasures. In some embodiments, the local database may be periodically updated to protect the processor from novel vulnerabilities.

With the foregoing in mind, FIG. 1 illustrates an example of an electronic device 10 that may benefit from the systems described herein. The electronic device 10 may include a computational system 12 that may include a processor 14 having a security system 15, detailed below. The electronic device 10 may include a memory 16. The processor 14 may be a single core processor or a multicore processor. In some systems, processor 14 may represent two or more processor devices operating in parallel, and that may access a common memory 16. Processor 14 may include a local cache memory, which may mirror portions of the memory 16 that are being actively used. In some embodiments, the processor 14 may be multi-threaded processor, which may manage multiple threads (e.g., multiple software programs, multiple process of a software program) concurrently. Examples of processors include complex instruction set processors (e.g., a x86 processor, a 64-bit x86 processor, the Intel® Atom® processor, the Intel® Core® processor, or the Intel® Xeon® processor) or reduced instruction set processor (e.g., an Advanced RISC Machine (ARM) processor).

Processor 14 may be communicatively coupled to a memory 16, which may be a random-access memory (RAM) device (e.g., a dynamic RAM (DRAM) device, a synchronous DRAM (SDRAM) device, a double-data rate SDRAM (DDR SDRAM) device), a low-power DDR device (LPDDR), a graphics DDR device (GDDR) device), or any other fast and addressable memory used to facilitate processing operations. In some systems, the computational system 12 may be a system-on-chip (SoC), in which processor 14 and memory 16 are disposed in a common package.

The processor 14 or the computational system 12 may be connected to other devices, such as the non-volatile memory 18, co-processors and accelerators 20, input interfaces 22, display interfaces 24, network interfaces 26, and other peripheral devices 28. Non-volatile memory 18 may refer to hard disk drives, floppy disks device, solid-state disk drives, optical media devices, magnetic back-up tape devices, or any other long-term storage systems. Co-processors and accelerators 20 may refer to graphical processing units (GPUs), shaders, compression co-processors, digital signal processors, encryption circuitry, and other specialized hardware that may be used to off-load commonly performed operations by the processor.

Input interfaces 22 may include keyboards, mouse, touchscreens, and microphones, and display interfaces 24 may include displays, and speakers. Input interfaces 22 and display interfaces 24 may allow a user to interact directly with the electronic device 10. A user may also interact with the electronic device 10 using a separate electronic device over a network interface 26. Network interfaces 26 may include wired interfaces, such as Ethernet interfaces or token-ring interfaces, and wireless interfaces, such as Wi-Fi interfaces, Bluetooth interfaces, or cellular interfaces. Other peripheral devices 28, such as sensors, actuators, and controllable devices may be connected to increase the functionality of the electronic device 10.

As discussed above, the processor 14 may execute tasks using data and/or instructions stored in the memory 16. FIG.

2 provides a logic diagram of a memory space 50 that may be managed by the processor 14. The memory space 50 is a schematic illustration of addressable memory that may be stored in the memory 16. It should be noted that, in some systems, a portion of the memory may be mirrored in a local cache disposed in processor 14. In the illustrated example, the memory space 50 includes software programs 52, 54, and 56, which may be executed by the processor 14. The software programs 52, 54, and 56 are represented by a list of addressable memory elements 58 and instructions 59. Certain instructions or sequence of instructions may access other addressable instructions or data.

In the illustration of the memory space 50, a sequence of instructions 60A in software program 52 may be include instructions for accessing an addressable data cell in the memory space. As an example, the sequence of instructions 60A may request a location (e.g., an address) contained in memory location 61B via an authorized call 70. Based on the address stored in memory location 61B, the sequence of instructions 60A may issue a call to access the addressable memory elements 58 or the instructions 59 in the memory space 50. For example, the memory location 61A may contain an address to memory 61B of the software program 54, which may be an authorized access. This access is represented by an authorized call 72. However, the memory location 61A may contain an address to memory or instruction 61C of the program 56, which may be unauthorized. This may be a result of an attack attempt in which an attacker injected an invalid address in memory location 61A. This access attempt is represented by the unauthorized call 74.

An instruction that attempts to access memory or instruction 61C from instruction 60A may be an attempt to hack the system. In some situations, the unauthorized call 74 may be logically prevented by, for example, boundary checking. However, instruction 60A may be part of a sequence that may a candidate for out-of-order execution for optimization. If the out-of-order execution is performed, the unauthorized call 74 may cause the processor to access the target data. Such access may create a vulnerability if the attacker monitors the processor (e.g., side channel attack). Examples of such situations include speculative execution of instructions, which may rely in pre-fetching memory or instruction 61C to a processor cache prior to verification of the authorization of the unauthorized call 74. To prevent that access, a security system 15 in the processor 14 may prevent unauthorized access of the memory or instruction 61C. The security system 15 of the processor 14 may inspect the sequence of instructions which includes instruction 60A or the memory 61A, and verify it poses a potential security threat. Such verification may take place by searching for a pattern that matches the instruction 60A or the access call 70 to an address from memory 61A. That pattern may be found in a security data structure of the security system 15, as detailed below. If the threat exists, the processor 14 may enforce a countermeasure that prevents out-of-order execution of the unauthorized call 74. As an example, the security system 15 in the processor 14 may identify that the sequence of instructions that include 60A has a pattern that indicates a suspicious injection to memory 61A and, as a countermeasure, prevents the out-of-order execution during runtime. For example, in order to prevent speculative execution of the instruction 60A, the processor may include serializing instructions (e.g., LFENCE instructions) around the potentially vulnerable instruction 60A as a countermeasure.

Figure 3:
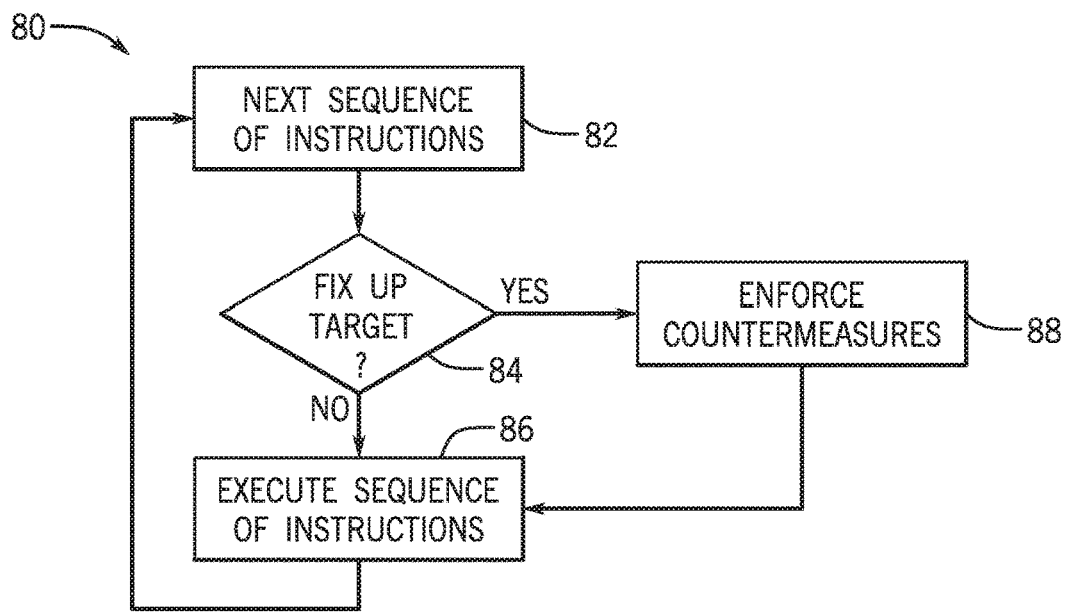
FIG. 3 is a flowchart of a method to identify fix up targets and implement associated countermeasures in sequences of instructions during runtime, in accordance with an embodiment.

FIG. 3 provides a flowchart of a method 80 to mitigate security vulnerabilities, as discussed above. The method 80 may be performed by the processor during runtime, in execution. During runtime, the processor may execute the next sequence of instructions, as represented by process 82. The security system (e.g., security system 15 in the processor 14) may inspect the sequence of instructions and search for the presence of fix up targets in decision block 84. As discussed herein, fix up targets may be sequences of instructions that may be vulnerable to a known attack. If the sequence of instructions is not matched to a fix up target in decision block 84, the instruction may be considered safe and, thus, executed in process 86. Following execution in process 86, the instruction pointer may be updated, and the method 80 iterates to the process 82 for the next sequence of instructions.

The decision block 84 may employ pattern matching, identity matching, or signature matching to identify the fix up targets. Pattern matching may refer to a process of matching the sequence of instructions to a known pattern based on similarity (e.g., presence of certain instructions in the sequence, presence of instructions in a certain order in the sequence, matching a regular expression that defines the known pattern). A sequence of instructions that is similar to a pattern in the database may be considered a fix up target. Identity matching may refer to a process of matching the sequence of instructions to an identical sequence of instructions. A sequence of instructions that is identical to a sequence of instructions in the database may be considered a fix up target. Signature matching may refer to matching the instructions to a signature, or hash. Sequence of instructions that have a hash found in the security data structure may a fix up target. The decision may be facilitated by the use of a local security data structure that stores the vulnerability patterns, potentially vulnerable sequence of instructions, and/or signatures.

The process performed in decision block 84 may also identify the type of vulnerability and implement an associated countermeasure. The countermeasure may be stored in the security data structure and may be associated with the fix up target. In process 88, the countermeasure may be enforced. Examples of countermeasures that may be enforced in process 88 include an addition of safe-enforcing instructions (e.g., serializing instructions, security fences), activation of a protected mode (e.g., activation of a safe execution mode), modification of the instruction to remove the threatening code, prevention of pre-fetching or out-of-order execution, implementation of data masking to mitigate side-channel attacks, implementation of index masking to prevent invalid access, or reinforce array overflow mitigation.

Figure 4:
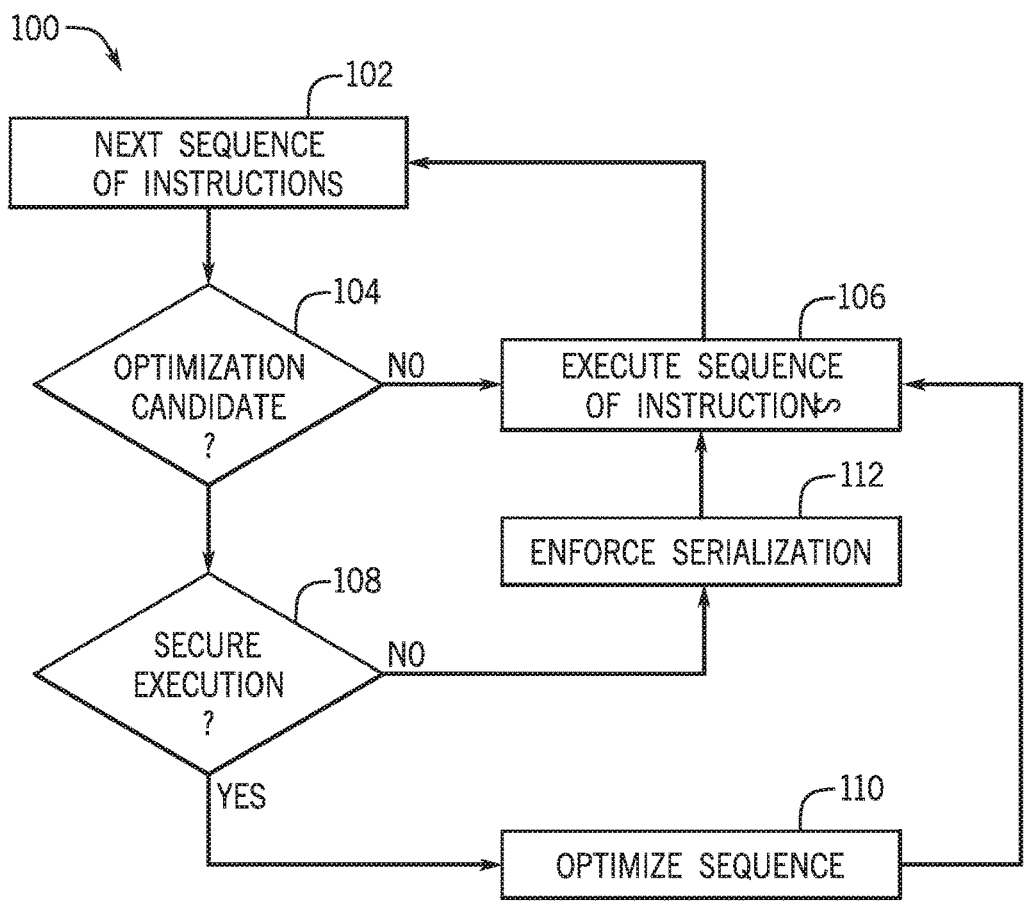
FIG. 4 is a flowchart of a method to identify and mitigate unsafe sequences of instructions that may be optimized with speculative execution, in accordance with an embodiment.

An example of a security mitigation method 100 is illustrated in FIG. 4. The method 100 may be performed by the processor during runtime, in execution. The method 100 may be used to mitigate vulnerabilities associated with speculative execution, such as speculative branch executions and/or similar out-of-order execution processes. As discussed above, the speculative execution may allow side-channel access exploiting pre-fetching optimizations. In order to mitigate such vulnerabilities, serialization instructions may be inserted prior to the execution, instructing the processor to not perform any pre-fetching. In a process 102, the next sequence of instructions may be retrieved, as discussed above. In decision block 104, the processor may inspect the sequence of instructions, and check if it is a candidate for optimization using out-of-order execution. Examples of instructions that may lead to speculative optimizations include conditional redirections (e.g., goto commands), function calls with parameters, or array access using variable indexes. If the sequence of instructions is not a candidate for optimization, the code may be executed in process 106 in its original form.

If the instruction contains a speculative optimization or similar out of order execution, the security system (e.g., a security system 15 in the processor 14) may inspect the sequence of instructions, in decision block 108. For example, the security system may check if the calls associated with the speculative optimization are based on a safe addressing instruction. As an example, the call may be safe if the address is generated within the sequence of instructions that originates the call. The call may be unsafe when the address is obtained from an external program (e.g., a library call) or memory address outside the sequence of instructions. The security system may make this determination by comparing the sequence of instructions with known fix up targets in the security data structure, as discussed above. In some embodiments, this comparison may be performed by inspecting flow graphs or data dependency graphs for the sequence of instructions that contains the optimization candidate. The flow graph or the data dependency graph may display a pattern that may be classified as safe or unsafe.

If the security system determines that the execution of the sequence of instructions is secure, in decision block 108, the may perform the optimizations (e.g., pre-fetch the data) in process 110 and, then, execute the instruction in process 106 in its original form. If the security system determines that the sequence of instructions is unsafe in decision block 108, the security system may enforce serialization in process 112. This enforcement of serialization may take place by adding serialization instructions that prevent pre-fetching, or another speculative optimization. The processor may, then, execute the instruction in process 106.

Figure 5:
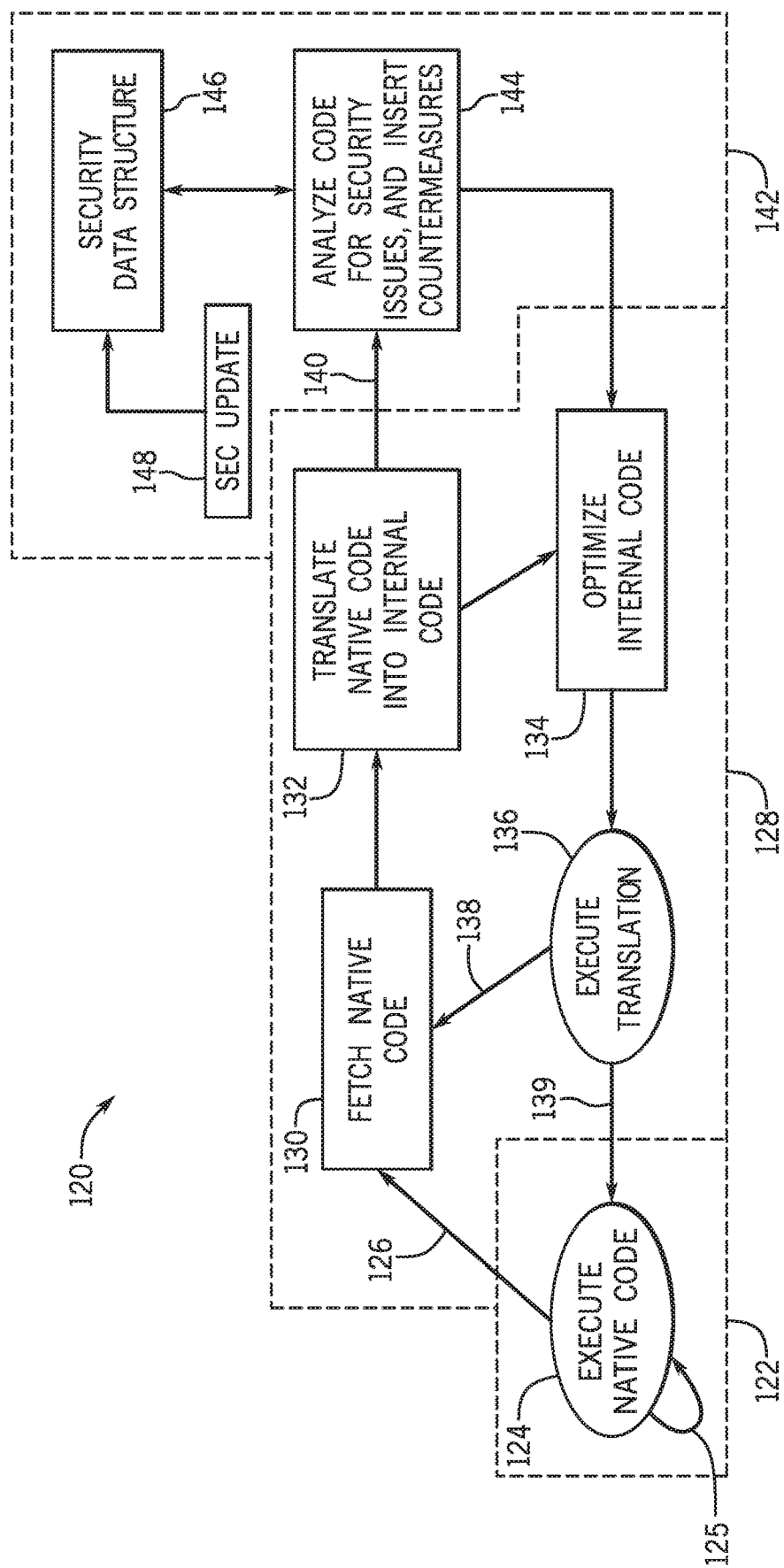
FIG. 5 is a diagram of a processor that includes a binary translation subsystem and a security subsystem to perform runtime code inspection and secure execution, in accordance with an embodiment.

To facilitate the operation of the security system, as described above, the processor 14 may employ a binary translation (BT) security system 120, as illustrated in FIG. 5. The processor 14 that operates the BT security system 120 may include a native code subsystem 122. During runtime, the processor may execute the sequence of instructions in the instruction set native to the processor, as illustrated in process 124. The BT security system 120 may continuously operate in the native code subsystem 122, through iterations 125, to perform instructions that are safe.

The BT security system 120 may, through transition 126, invoke the binary translation subsystem 128. The transition 126 may be triggered by the security system when a fix up target is identified in the sequence of instructions executed in the process 124. In some embodiments, the transition 126 may also be triggered by the processor when an execution hotspot (e.g., a frequently called instruction or sequence of instructions) is identified. Upon entering the binary translation subsystem 128, the native code may be fetched in process 130 and translated to a translated code in process 132. Instructions associated with this dedicated circuitry may be identified and replaced by optimized instructions in process 134 (e.g., vectorized operations, combined operations). The binary translation may be executed in process 136. The binary translation subsystem 128 may fetch the next sequence of instructions and retain control of execution in the processor via transition 138 or may leave the binary translation subsystem 128 and return the control of execution to the native code subsystem 122 via transition 139.

The BT security system 120 may enter the binary translation subsystem 128 when a fix up target is identified in the native code, as discussed above with respect to transition 126. The fix up target may be translated to an internal code representation in process 132, which may be suitable for further inspection, as discussed above. A transition 140 may activate the security subsystem 142 for analysis of the sequence of instructions as illustrated, for example, in FIG. 3. In process 144, the security system may inspect the sequence of instructions for fix up targets. This inspection may be performed by accessing a security data structure 146, as discussed above. When a fix up target is identified, countermeasures may be incorporated to the execution in process 144 to produce a safer version of the sequence of instructions. After implementation of the countermeasures, the control of execution may be returned to the binary translation subsystem 128, where the instructions may be optimized or executed.

The security data structure 146 may include entries associated with fix up targets. The fix up targets in the security data structure 146 may have native code representations, to trigger transition 126. The fix up targets in the security data structure 146 may have internal code representations (e.g., binary translations), to trigger transition 140. Moreover, the fix up targets in the security data structure 146 may be associated with countermeasures that may be inserted, to mitigate vulnerabilities. In order to keep the security subsystem 142 current, security updates 148 may be incorporated to the security data structure 146.

The use of the internal code for identifying fix up targets and/or implementing counter measures may improve the performance of the security subsystem 142. In some embodiments, the fix up targets may become more evident in the internal code representation. For example, the internal code may employ a representation that is more directly associated to data source graphs or flow graphs and, thus, may be more easily matched with a pattern included in the security data structure 146. Moreover, different processor architectures that have different native instructions sets may share an internal instruction set of the binary translation subsystem 128. As a result, a common security data structure 146 may be used across different architectures, which may facilitate the speed of implementation of the security countermeasures.

Figure 6:
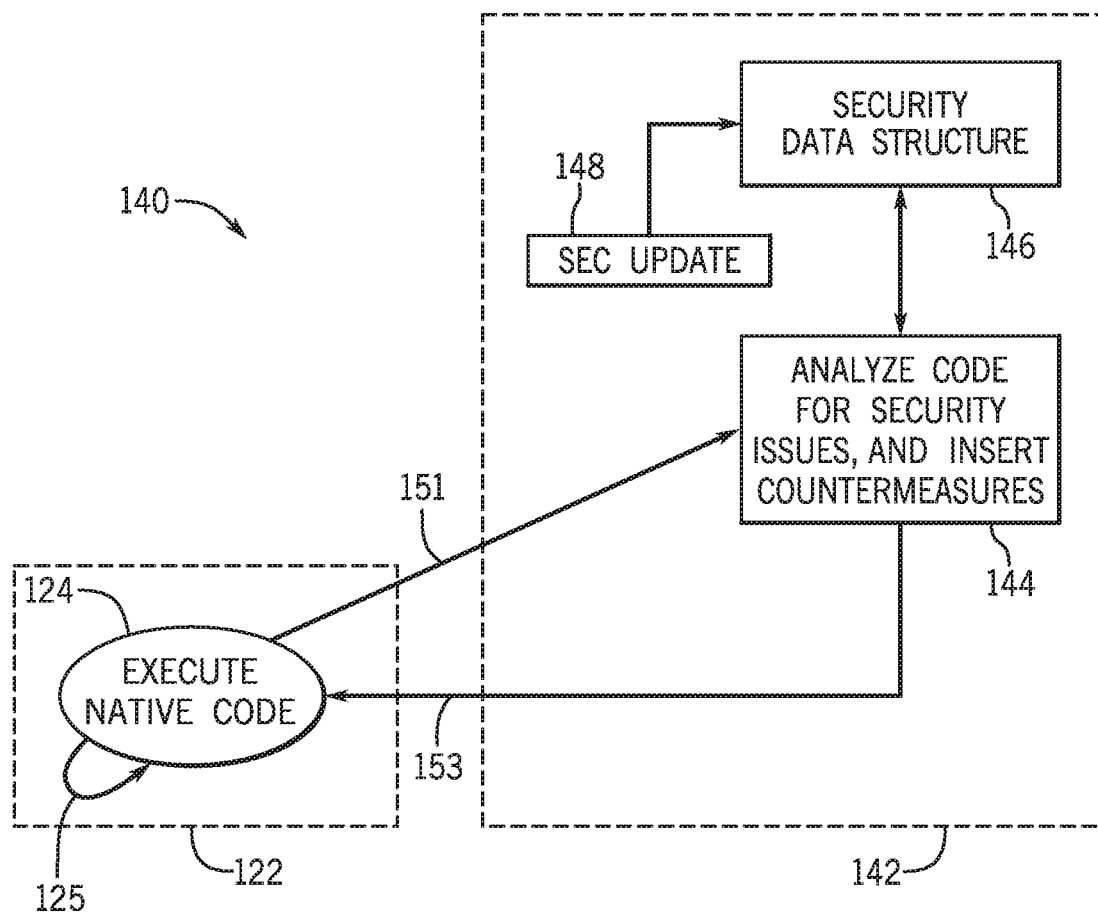
FIG. 6 is a diagram of a processor that includes a security subsystem that performs runtime code inspection and secure execution in a native instruction set, in accordance with an embodiment.

Some embodiments, such as the native security system 149 of FIG. 6, may include a security subsystem 142 that may interact directly with the native code subsystem 122. In such embodiments, the security subsystem 142 may inspect the sequence of instructions and implement countermeasures directly in the native code. If a fix up target is identified during execution, in process 124, a transition 151 may be triggered. In process 144, the processor may inspect the sequence of instructions for fix up targets by comparison with sequences of instructions in the security data structure 146. When a fix up target is identified, countermeasures may be incorporated to the execution in process 144 to produce a safer version of the sequence of instructions. The processor 14 may resume execution of the safe sequence of instructions in the native code subsystem 122, via transition 153.

Figure 7:
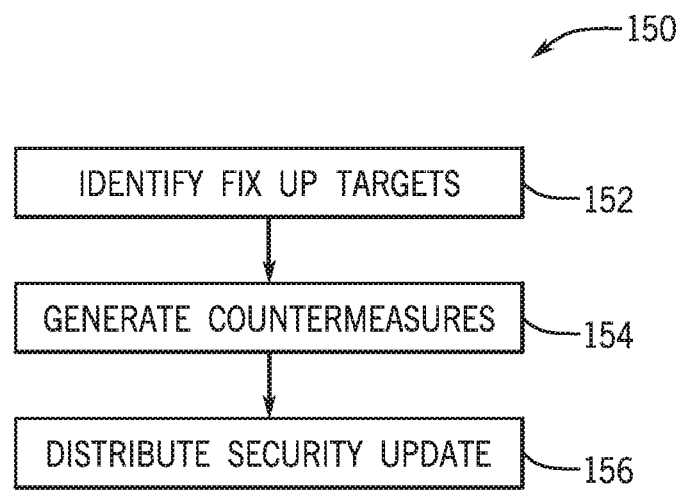
FIG. 7 is a flowchart of a method to distribute security updates that may be used to update a security system in a processor, in accordance with an embodiment.

The flow chart in FIG. 7 illustrates a method 150 to update processors, such as a processor 14. Method 150 may be used to update security systems by updating security data structures, such as the security data structure 146 illustrated in FIG. 5. The method 150 may be performed following an identification of a potential processor-level vulnerability and/or periodically. In a process 152, fix up targets associated with the vulnerabilities may be identified. This identification may be performed automatically, by using statistical tools, machine learning tools, and/or declarative language tools that may identify sequence instructions, sequence instruction patterns, and/or sequence instruction signatures associated with a vulnerability. The fix up targets may be encoded as instruction sequence patterns to be added to a security data structure 146. The fix up targets may be encoded in a native instruction set representation or in an internal instruction set representation, as discussed above.

In a process 154, countermeasures that mitigate the vulnerability may be encoded. The countermeasures may be encoded as machine-readable security instructions to be executed by the security subsystem 142 of the processor. In some embodiments, the countermeasures may be encoded in a native instruction set representation or in an internal instruction set representation. For example, the countermeasure associated with an out-of-order vulnerability attack may be to insert a serializing instruction (e.g., an LFENCE instruction) prior to execution of the instructions. The countermeasures generated in process 154 may be associated to the fix up targets identified in process 152 and assembled as security data structure entries. Based on these novel entries, a security data structure update (e.g., security update 148 of FIG. 5) may be generated for distribution to electronic systems, in process 156. The distribution of the security update 148 may take place over the internet, or by physical media.

With the foregoing in mind, FIGS. 8-15 illustrate embodiments of processors and/or processor-based systems that may benefit from the above-described security systems. Processor cores may be implemented in different ways, for different purposes, and in different processors. For instance, implementations of such cores may include: 1) a general-purpose in-order core intended for general-purpose computing; 2) a high performance general-purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Example core architectures are described next, followed by descriptions of example processors and computer architectures.

Figure 8:
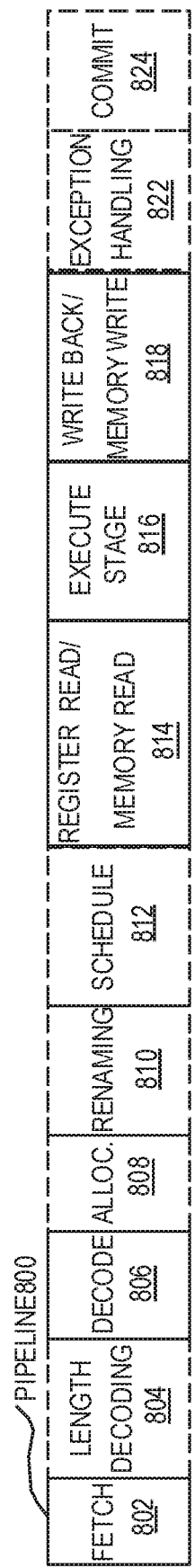
FIG. 8 is a block diagram illustrating both an example in-order pipeline and an example register renaming, out-of-order issue/execution pipeline, in accordance with an embodiment.
Figure 9:
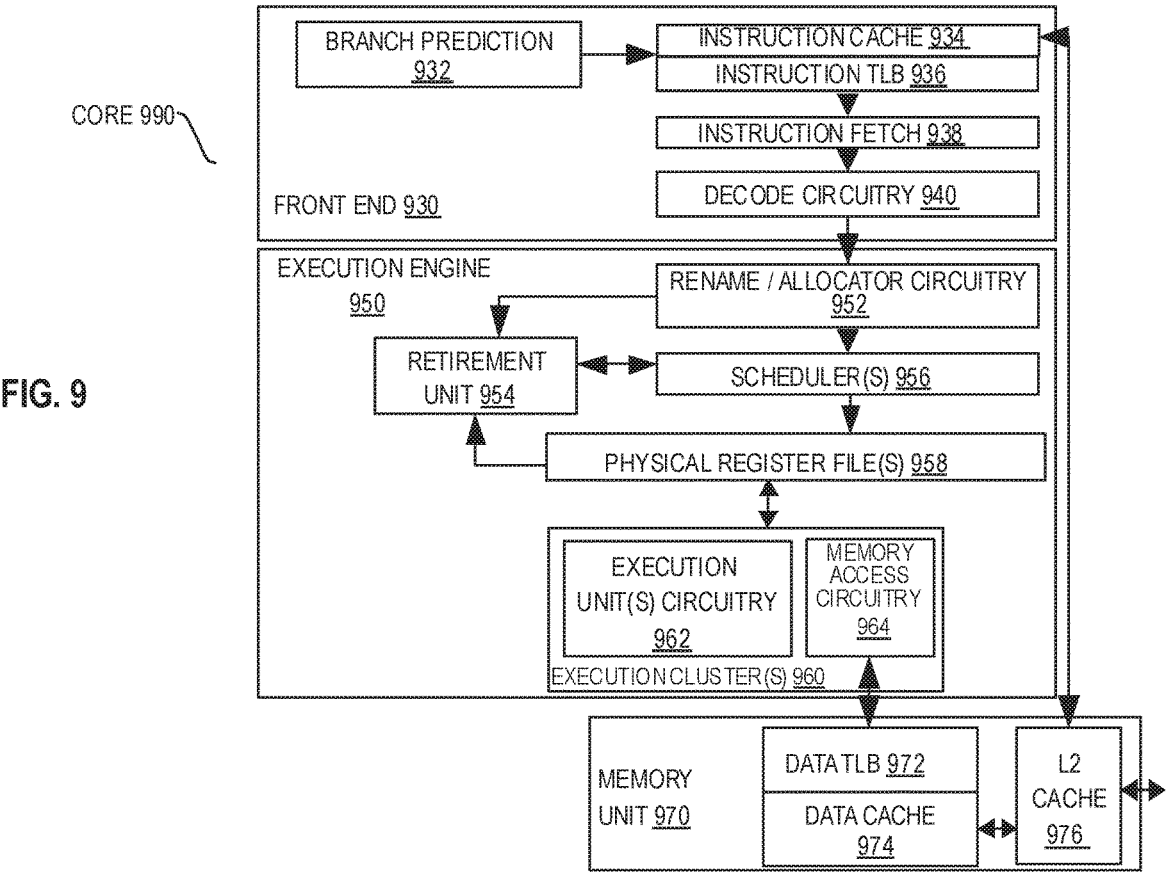
FIG. 9 is a block diagram illustrating both an example embodiment of an in-order architecture core and an example register renaming, out-of-order issue/execution architecture core to be included in a processor, in accordance with an embodiment.

FIG. 8 is a block diagram illustrating both an example in-order pipeline and an example register renaming, out-of-order issue/execution pipeline according to embodiments of the disclosure. FIG. 9 is a block diagram illustrating both an example embodiment of an in-order architecture core and an example register renaming, out-of-order issue/execution architecture core to be included in a processor according to embodiments of the disclosure. The solid lined boxes in FIGS. 8 and 9 illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described. As discussed above, the out-of-order issue/execution pipeline may implement processor level optimizations (e.g., processor block 110 in FIG. 4).

In FIG. 8, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 9 shows processor core 990 including a front-end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front-end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general-purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.).

The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one example embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the example register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 10:
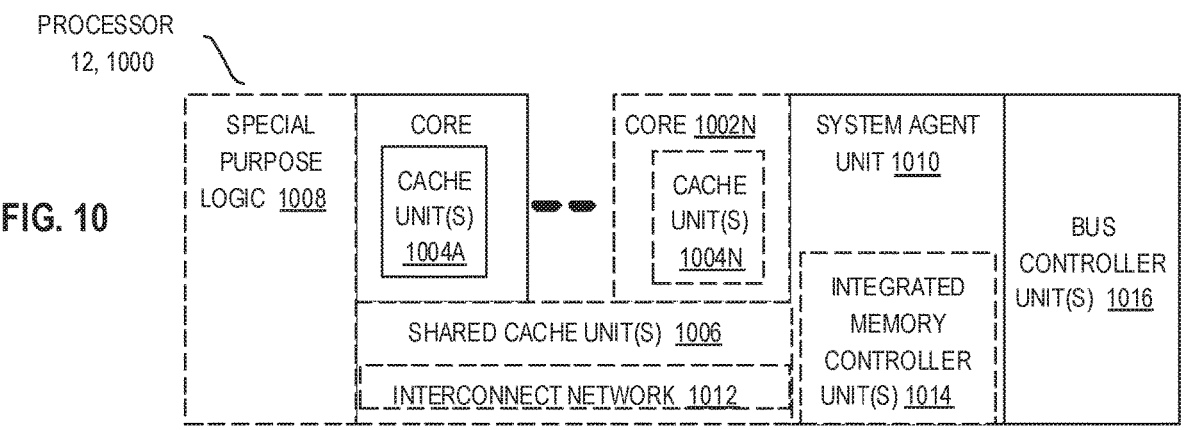
FIG. 10 is a block diagram of a processor that may have more than one core, may have an integrated memory controller, and may have integrated graphics according to an embodiment.

FIG. 10 is a block diagram of a processor 1000 that may have more than one core, may have an integrated memory controller, and may have integrated graphics according to embodiments of the disclosure. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008. Processor 1000 may include the security system discussed above.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring-based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

FIGS. 11-14 are block diagrams of example computer architectures that may benefit from the above-described secure processors. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
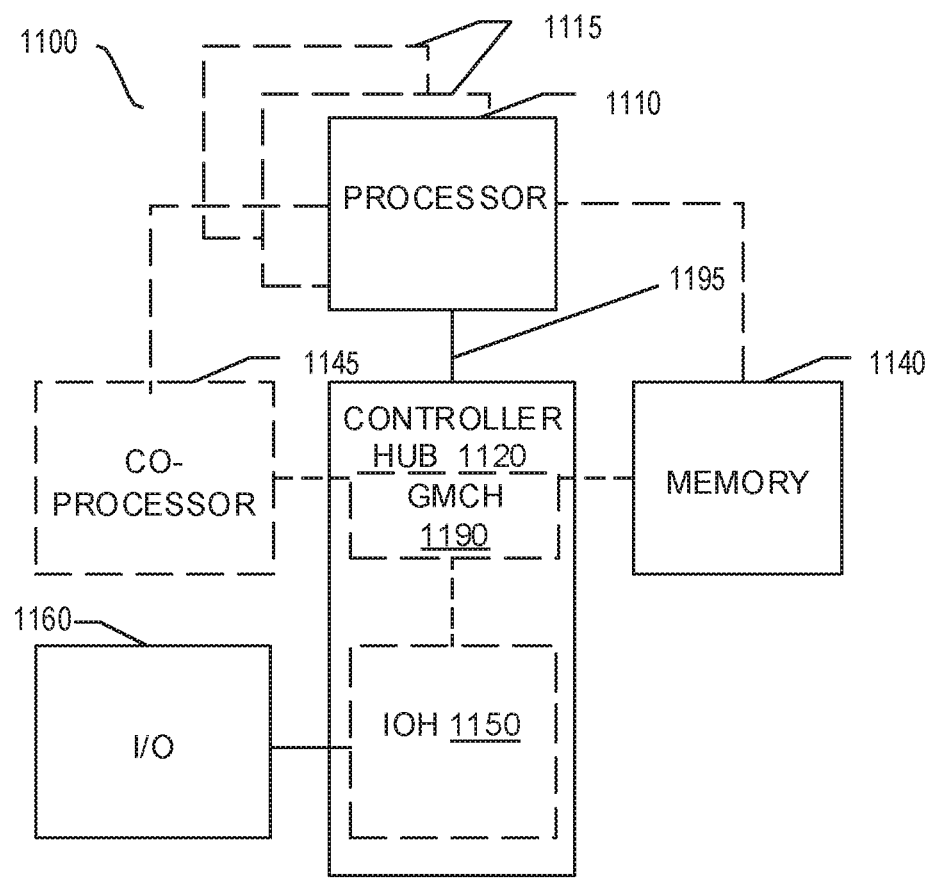
FIG. 11 is a block diagram of a system in accordance with an embodiment.

Referring now to FIG. 11, shown is a block diagram of a system 1100 in accordance with one embodiment of the present disclosure. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random-access memory (DRAM), phase change memory (PCM), or a combination of the two. For at least one embodiment, the controller hub 1120 communicates with the processor(s) 1110, 1115 via a multi-drop bus, such as a front-side bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
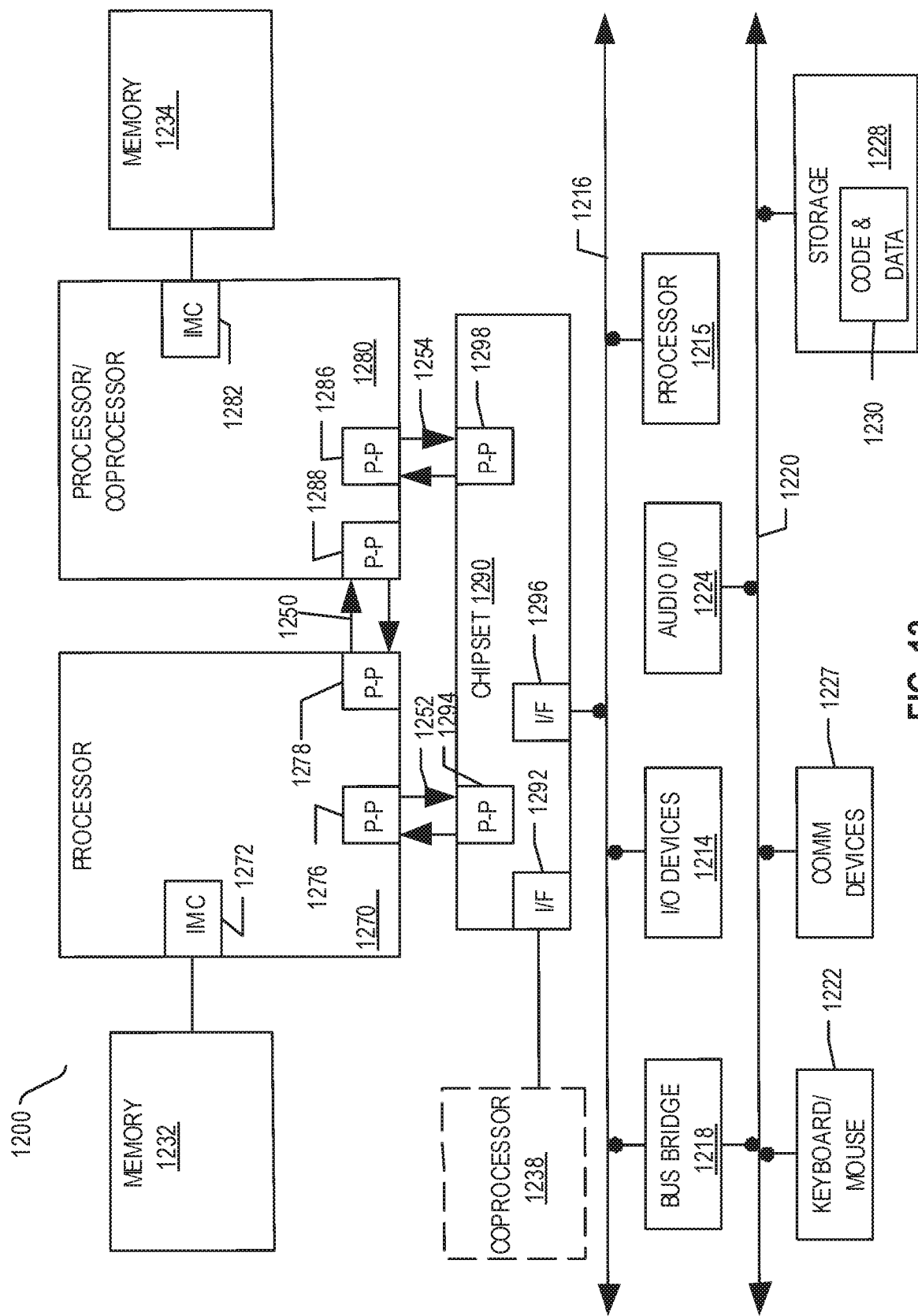
FIG. 12 is a block diagram of a first specific example system in accordance with an embodiment.

Referring now to FIG. 12, shown is a block diagram of a first more specific example system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the disclosure, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point-to-point interface circuits 1276, 1294, 1286, and 1298. Chipset 1290 may optionally exchange information with the coprocessor 1238 via a high-performance interface 1292. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPUs, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
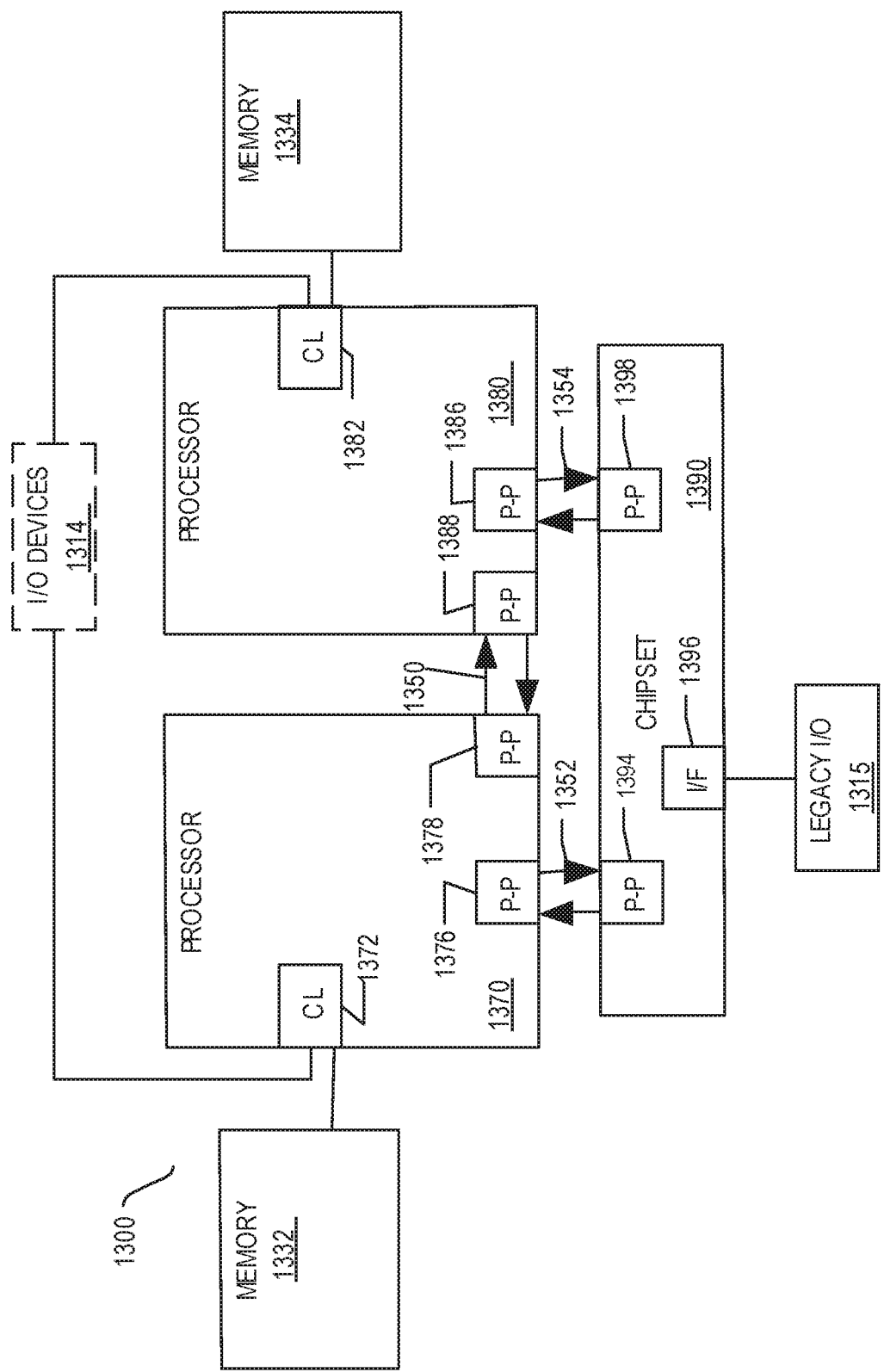
FIG. 13 is a block diagram of a second more specific example system in accordance with an embodiment.

Referring now to FIG. 13, shown is a block diagram of a second more specific example system 1300 in accordance with an embodiment of the present disclosure. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CLs 1272 and 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
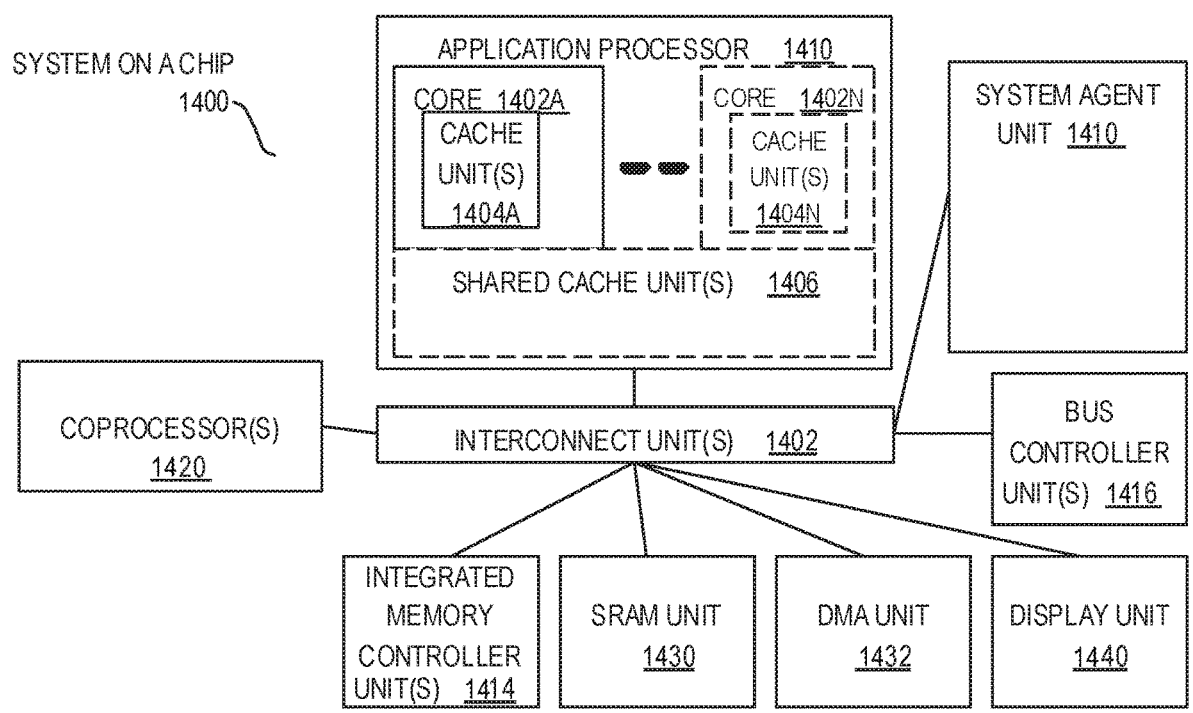
FIG. 14 is a block diagram of a system-on-chip (SoC) in accordance with an embodiment.

Referring now to FIG. 14, shown is a block diagram of a SoC 1400 in accordance with an embodiment of the present disclosure. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 1002A-N, which include cache units 1004A-N, and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), rewritable compact disk (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

As discussed above, a binary translation may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
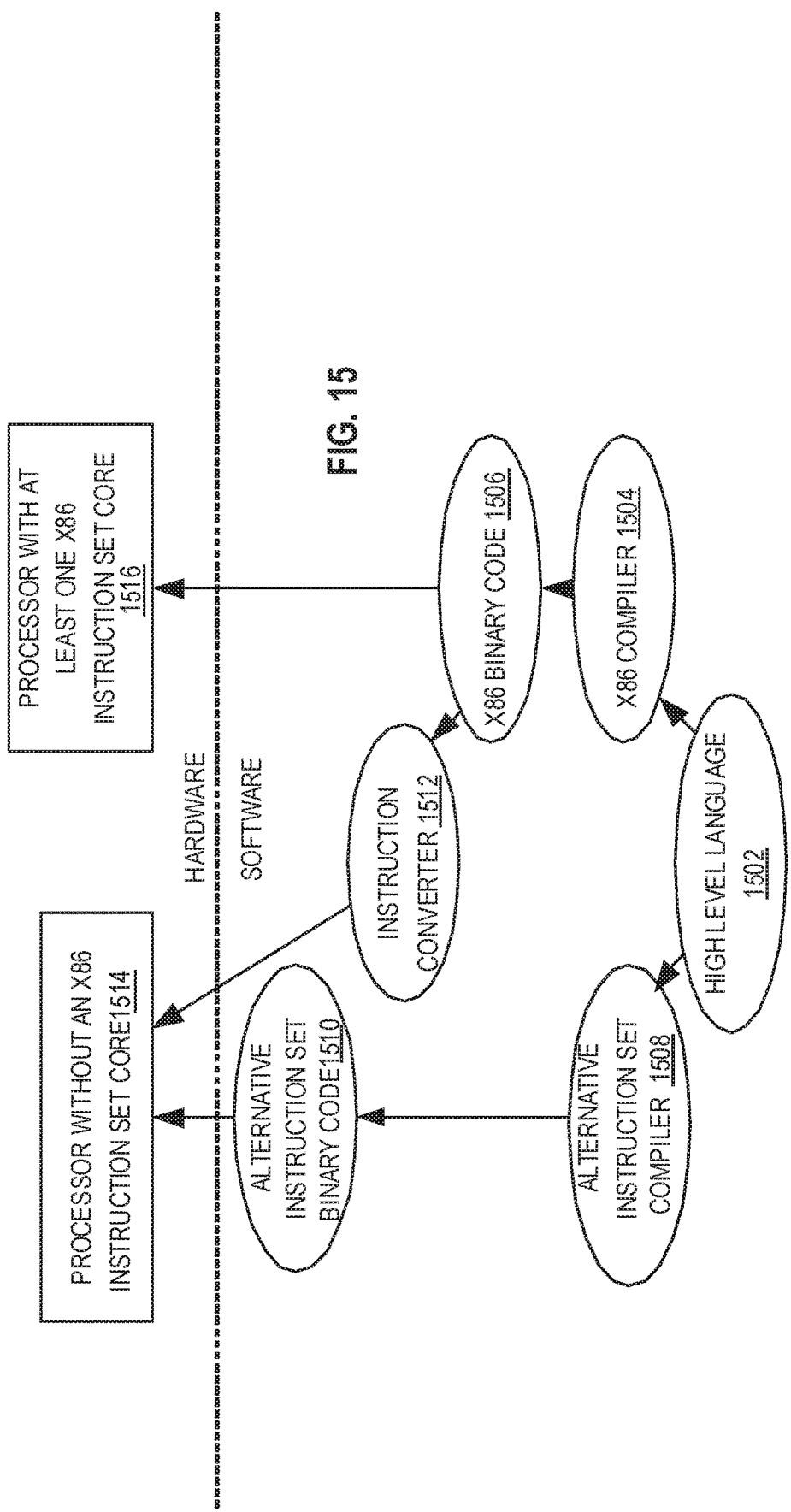
FIG. 15 is a block diagram contrasting the use of a software instruction converter to convert binary instructions in a source instruction set to binary instructions in a target instruction set, in accordance with an embodiment.

FIG. 15 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 15 shows a program in a high-level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516.

Similarly, FIG. 15 shows the program in the high-level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

The methods and devices of this disclosure may be incorporated into any suitable circuit. For example, the methods and devices may be incorporated into numerous types of devices such as microprocessors, memory devices, interface controllers, or other integrated circuits. Implementations may be incorporated in the form software, soft logic implemented in a programmable logic device (PLD) or field-programmable gate array (FPGA), hard-logic implemented in a PLD or FPGA, or application-specific integrated circuit (ASIC). Moreover, while the method and operations have been described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of overlying operations is performed as desired.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A processor comprising:
   a native code subsystem comprising circuitry operable to execute a first instruction set, wherein the first instruction set is in a native code to the processor;
   a binary translation subsystem comprising circuitry operable to translate the first instruction set to a second instruction set, wherein the second instruction set is a processor internal code representation of the first instruction set; and
   a security subsystem comprising a security data structure that comprises a set of fix up target patterns and a set of countermeasures, wherein each fix up target pattern of the set of fix up target patterns comprises an instruction sequence, and wherein the security subsystem:
      parses the second instruction set to detect a sequence of a subset of the second instruction set that corresponds to an instruction sequence of a fix up target pattern of the set of fix up target patterns of the security data structure prior to execution by the native code subsystem;
      implements a countermeasure of the set of countermeasures of the security data structure associated with the fix up target pattern into the second instruction set; and
      performs the second instruction set in the native code subsystem or the binary translation subsystem, following implementation of the countermeasure.

2. The processor of claim 1, wherein the security subsystem is to parse the first instruction set.

3. The processor of claim 1, wherein parsing the second instruction set comprises assembling a data dependency graph or a flow graph associated with the second instruction set and using the data dependency graph or the flow graph to parse the second instruction set.

4. The processor of claim 1, wherein the set of fix up target patterns comprise a plurality of fix up target patterns and the set of countermeasures comprise a plurality of countermeasures, wherein each fix up target pattern of the plurality of fix up target patterns is associated with at least one countermeasure of the plurality of countermeasures.

5. The processor of claim 4, wherein parsing the second instruction set comprises comparing the second instruction set with the plurality of fix up target patterns of the security data structure.

6. The processor of claim 1, wherein parsing the second instruction set comprises performing at least one of pattern matching, identity matching, and a signature matching.

7. The processor of claim 1, wherein the fix up target pattern comprises a speculative execution vulnerability or an out-of-order execution vulnerability.

8. The processor of claim 1, wherein the countermeasure comprises an addition of a serialization instruction.

9. The processor of claim 1, wherein the second instruction set is binary translation representation of the first instruction set.

10. A method comprising:
    receiving, by a native code subsystem of a processor, a sequence of instructions in a native instruction set using a native code to the processor;
    translating, by a binary translation subsystem of the processor, the sequence of instructions from the native instruction set to a processor internal code instruction set;
    identifying, by a security subsystem of the processor, a vulnerability in the translated sequence of instructions in the processor internal code instruction set by comparing the translated sequence of instructions with an instruction sequence of each fix up target pattern of a first set of fix up target patterns of a security data structure, wherein the vulnerability is associated with a fix up target pattern of the first set of fix up target patterns; and implementing, by the security subsystem, a countermeasure associated with the vulnerability, wherein the security data structure associates the countermeasure with the fix up target pattern.

11. The method of claim 10, wherein the sequence of instructions is received in the native instruction set and the fix up target pattern is represented in the processor internal code instruction set.

12. The method of claim 10, wherein the fix up target pattern is represented in the binary translation.

13. The method of claim 10, wherein implementing the countermeasure comprises adding a countermeasure instruction for execution prior to executing the sequence of instructions or the translated sequence of instructions, wherein the countermeasure instruction is associated with the countermeasure.

14. The method of claim 13, wherein the countermeasure instruction comprises a serializing instruction.

15. The method of claim 10, comprising receiving an update to the security data structure comprising a second set of fix up target patterns.

16. A system comprising:
a memory device comprising machine-readable instructions; and
a processor to execute the machine-readable instructions, wherein the processor comprises a security data structure comprising a first set of fix up target patterns and a first set of countermeasures, wherein each fix up target pattern of the first set of fix up target patterns comprises an instruction sequence, and wherein each fix up target pattern of the first set of fix up target patterns is associated with at least one countermeasure of the first set of countermeasures, and wherein the processor is configured to:
translate the machine readable instructions from a native instruction set to a processor internal code representation of the machine readable instructions;
find at least one instruction sequence of at least one fix up target pattern of the first set of fix up target patterns of the security data structure in a sequence of the processor internal code representation of the machine-readable instructions prior to execution; and
implementing a countermeasure of the first set of countermeasures of the security data structure, wherein the countermeasure is associated with the at least one fix up target pattern.

17. The system of claim 16, wherein the processor is configured to:
receive security updates comprising a second set of fix up target patterns and a second set of countermeasures; and
add the second set of fix up target patterns and the second set of countermeasures to the security data structure.

18. The system of claim 17, wherein the security updates are received over a network connection.

19. The system of claim 16, comprising a binary translation subsystem configured to translate the machine-readable instructions from the native instruction set to the processor internal code representation of the machine readable instructions using a binary translation, and wherein the first set of fix up target patterns corresponds to binary translation representations.

20. The system of claim 16, wherein the first set of fix up target patterns comprises a speculative execution vulnerability pattern, and wherein at least one countermeasure associated with the speculative execution vulnerability pattern comprises an insertion of a serializing instruction.

* * * * *